United States Patent
Singireddy et al.

(10) Patent No.: US 11,729,101 B1
(45) Date of Patent: Aug. 15, 2023

(54) LOAD BALANCING OVER A PLURALITY OF PACKET FORWARDING COMPONENTS

(71) Applicant: Juniper Networks, Inc., Sunnyvale, CA (US)

(72) Inventors: Avinash Reddy Singireddy, Sunnyvale, CA (US); Swamy Sadashivaiah Renu Kananda, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/449,103

(22) Filed: Sep. 28, 2021

Related U.S. Application Data

(63) Continuation of application No. 16/706,177, filed on Dec. 6, 2019, now Pat. No. 11,140,083.

(51) Int. Cl.
*H04L 47/125* (2022.01)
*H04L 47/41* (2022.01)

(52) U.S. Cl.
CPC .......... *H04L 47/125* (2013.01); *H04L 47/41* (2013.01)

(58) Field of Classification Search
CPC .................. H04L 47/125; H04L 47/41
See application file for complete search history.

(56) References Cited

U.S. PATENT DOCUMENTS

| | | | |
|---|---|---|---|
| 7,787,370 B1 | 8/2010 | Aweya et al. | |
| 8,937,865 B1 | 1/2015 | Kumar et al. | |
| 9,548,926 B2 * | 1/2017 | Raman | H04L 12/18 |
| 9,825,865 B1 | 11/2017 | Sharma et al. | |
| 10,887,234 B1 * | 1/2021 | Singh | H04L 45/14 |
| 10,904,150 B1 * | 1/2021 | Kampeas | H04L 45/124 |
| 11,140,083 B1 | 10/2021 | Singireddy et al. | |
| 2008/0219281 A1 | 9/2008 | Akin et al. | |
| 2008/0291826 A1 | 11/2008 | Licardie et al. | |
| 2008/0298236 A1 | 12/2008 | Ervin et al. | |
| 2013/0201826 A1 * | 8/2013 | Testa | H04L 47/125 370/230 |
| 2014/0105024 A1 | 4/2014 | Yu et al. | |
| 2015/0032871 A1 * | 1/2015 | Allan | H04L 47/125 709/223 |

(Continued)

*Primary Examiner* — Chi H Pham
*Assistant Examiner* — Vladislav Y Agureyev
(74) *Attorney, Agent, or Firm* — Harrity & Harrity, LLP

(57) ABSTRACT

A load balancing component may obtain, from a plurality of packet forwarding components of the network device, indications of load balancing metrics associated with a plurality of communication links that the plurality of packet forwarding components use to forward packet data. The load balancing component may determine, based on the load balancing metrics, aggregate load balancing metrics associated with respective communication links of the plurality of communication links. The load balancing component may identify an imbalance in load balancing metrics. The load balancing component may determine, based on the imbalance, a load balancing schedule that indicates traffic distributions for the plurality of packet forwarding components. The load balancing component may provide indications of the traffic distributions to the plurality of packet forwarding components to permit the plurality of packet forwarding components to forward packet data based on the indications of the traffic distributions.

20 Claims, 11 Drawing Sheets

(56) References Cited

U.S. PATENT DOCUMENTS

| | | |
|---|---|---|
| 2015/0138986 A1* | 5/2015 | Gale ............... H04L 47/125 370/237 |
| 2015/0163146 A1 | 6/2015 | Zhang et al. |
| 2016/0182380 A1 | 6/2016 | Mehra et al. |
| 2017/0099224 A1* | 4/2017 | O'Connor ......... H04L 43/0894 |
| 2018/0359186 A1* | 12/2018 | Harari ............. H04L 47/2483 |
| 2019/0280963 A1* | 9/2019 | Michael ............. H04L 45/22 |
| 2019/0288946 A1* | 9/2019 | Gupta ............... H04L 45/38 |
| 2019/0327172 A1* | 10/2019 | Shen ................ H04L 45/127 |
| 2019/0327173 A1* | 10/2019 | Gafni ............... H04L 47/125 |
| 2019/0327174 A1* | 10/2019 | LaVigne .............. H04L 47/41 |
| 2020/0128440 A1 | 4/2020 | Srinivasamurthy et al. |
| 2020/0153739 A1* | 5/2020 | Gafni ................ H04L 47/41 |
| 2022/0006726 A1* | 1/2022 | Michael ............ H04L 41/0806 |
| 2022/0124038 A1* | 4/2022 | Leguay ............. H04L 47/2483 |

\* cited by examiner

LOAD BALANCING OVER A PLURALITY OF PACKET FORWARDING COMPONENTS

RELATED APPLICATION

This application is a continuation of U.S. patent application Ser. No. 16/706,177, filed Dec. 6, 2019 (now U.S. Pat. No. 11,140,083), which is incorporated herein by reference in its entirety.

BACKGROUND

Load balancing is a technique for distributing loads across multiple computing resources in an attempt to avoid overloading one or more communication links used to forward packet data. A packet forwarding component of a network device may perform load balancing based on quantities of data packets sent via each communication link that the packet forwarding component uses to forward packet data.

SUMMARY

According to some implementations, a method may include obtaining, by a load balancing component of a network device and from a plurality of packet forwarding components of the network device, indications of rates of forwarded packet data associated with a plurality of communication links that the plurality of packet forwarding components use to forward packet data; determining, by the load balancing component and based on the rates of forwarded packet data, aggregate rates of forwarded packet data associated with respective communication links of the plurality of communication links; identifying, by the load balancing component, a first communication link having a first aggregate rate of forwarded packet data that exceeds a second aggregate rate of forwarded packet data of a second communication link by an amount that satisfies a balancing threshold; determining, by the load balancing component and based on the first aggregate rate of forwarded packet data exceeding the second aggregate rate of forwarded packet data by the amount that satisfies the balancing threshold, a load balancing schedule that indicates traffic distributions for the plurality of packet forwarding components, wherein the load balancing schedule is determined to reduce the first aggregate rate of forwarded packet data, increase the second aggregate rate of forwarded packet data, or reduce the first aggregate rate of forwarded packet data and increase the second aggregate rate of forwarded packet data; and providing, by the load balancing component, indications of the traffic distributions to the plurality of packet forwarding components to permit the plurality of packet forwarding components to forward packet data based on the indications of the traffic distributions.

According to some implementations, a network device may include: a plurality of packet forwarding components, and a load balancing component to: obtain, from the plurality of packet forwarding components, indications of load balancing metrics associated with a plurality of communication links that the plurality of packet forwarding components use to forward packet data; determine, based on the load balancing metrics, aggregate load balancing metrics associated with respective communication links of the plurality of communication links; determine, based on the aggregate load balancing metrics, a load balancing schedule for the plurality of packet forwarding components, wherein the load balancing schedule indicates traffic distributions for the plurality of packet forwarding components; and provide indications of the traffic distributions to the plurality of packet forwarding components to permit the plurality of packet forwarding components to forward packet data based on the indications of the traffic distributions.

According to some implementations, a non-transitory computer-readable medium may store one or more instructions. The one or more instructions, when executed by one or more processors, may cause the one or more processors to: obtain, from a plurality of packet forwarding components, indications of load balancing metrics associated with a plurality of communication links that the plurality of packet forwarding components use to forward packet data; determine, based on the load balancing metrics, aggregate load balancing metrics associated with respective communication links of the plurality of communication links; determine, based on the aggregate load balancing metrics, a load balancing schedule for the plurality of packet forwarding components, wherein the load balancing schedule indicates traffic distributions for the plurality of packet forwarding components; and provide indications of the traffic distributions to the plurality of packet forwarding components to permit the plurality of packet forwarding components to forward packet data based on the indications of the traffic distributions, wherein an indication of the indications of the traffic distributions indicates, for a particular packet forwarding component of the plurality of packet forwarding components, portions of packet data to forward via respective communication links of the plurality of communication links.

DETAILED DESCRIPTION

Figure 1A:
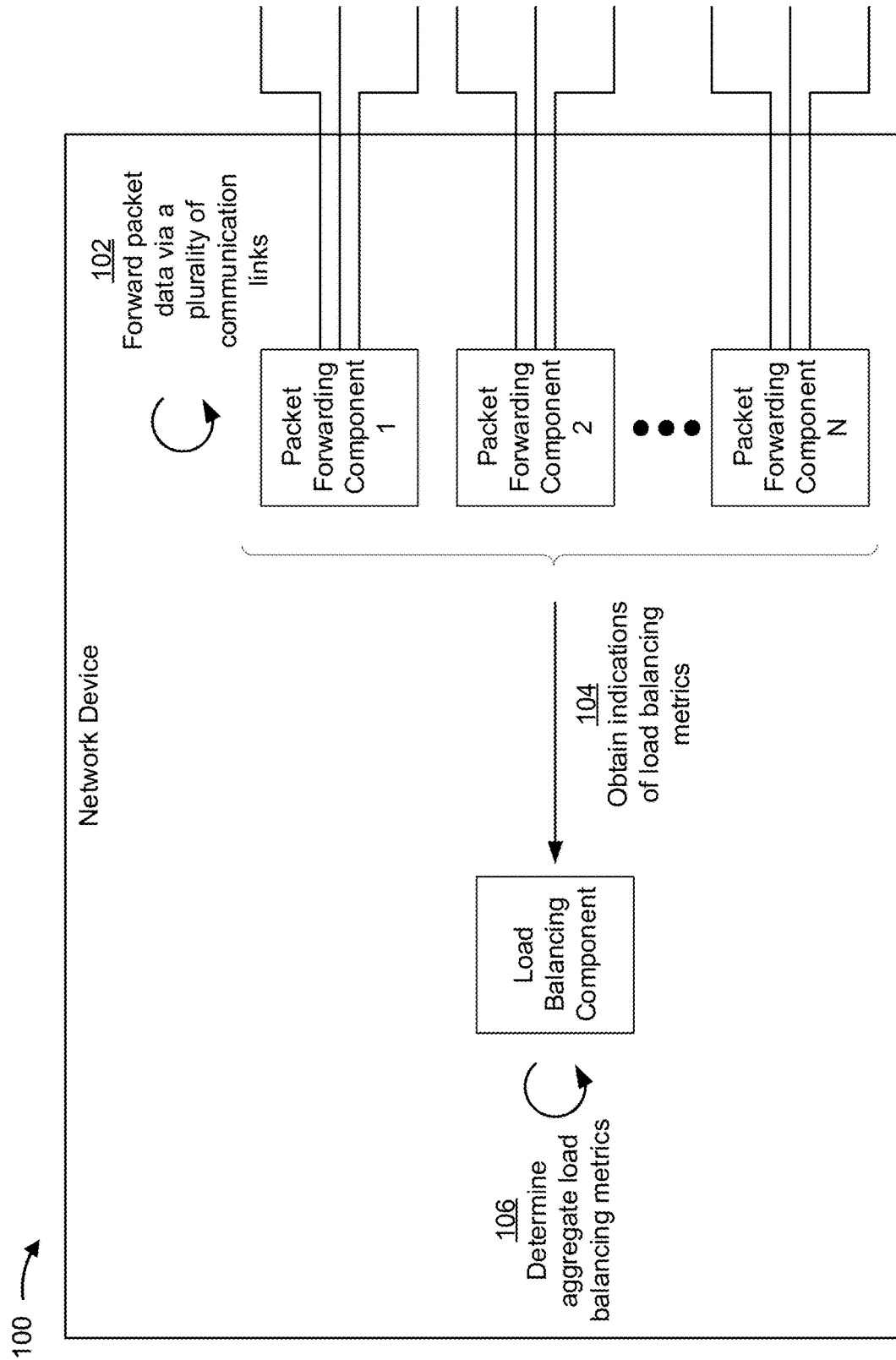
FIGS. 1A-1E are diagrams of one or more example implementations described herein.

The following detailed description of example implementations refers to the accompanying drawings. The same reference numbers in different drawings may identify the same or similar elements.

A network device may include a packet forwarding component that forwards packet data to one or more other network devices in a network. The packet forwarding component may choose between a plurality of communication links to use to forward packet data over different paths. For example, the packet forwarding component may choose to forward the packet data to a target network device via a first path that includes a first intermediate network device or via a second path that includes a second intermediate network device. The packet forwarding component may select communication links to use to forward data packets based on a random selection process, a semi-random selection process based on attributes of the data packets, a selection process based on times at which the packet forwarding component receives data packets, another process intended to distribute the data packets among the plurality of communication links, and/or the like.

When forwarding the data packets, the packet forwarding component may detect an imbalance of load among the plurality of communication links. The packet forwarding component may modify the selection of communication links to attempt to balance the load among the plurality of communication links. This may improve a balance of the loads that the packet forwarding component places on the plurality of communication links. However, another packet forwarding component of the network device may also forward data packets via one or more of the plurality of communication links. Without coordination between the packet forwarding components of the network device, the packet forwarding components may overload some of the plurality of communication links without detecting the overload.

In a particular example, a first routing component may forward 18 megabits per second (Mbps) of packet data divided equally between communication links A, B, and C, which each have a capacity of 10 Mbps. A second routing component may forward 15 Mbps of packet data divided equally between communication links B, C, and D, which also has a capacity of 10 Mbps. In this particular example, communication link A is underloaded (6 Mbps), communication link B is overloaded (11 Mbps), communication link C is overloaded (11 Mbps), and communication link D is underloaded (5 Mbps). Even though the total capacity (40 Mbps) of the communication links A, B, C, and D is enough to support forwarding of the total 33 Mbps of packet data, two of the communication links are overloaded and two of the communication links are below capacity because the first routing component does not have visibility into the second routing component, and vice versa.

In another particular example, a first routing component may forward 14 Mbps of packet data among the same communication links A, B, and C, with a balancing threshold of a 2 Mbps difference between the communication links. A second routing component may forward 13 Mbps of packet data among the same communication links with a balancing threshold of 2 Mbps difference between the communication links. The first routing component may forward 6 Mbps, 4 Mbps, and 4 Mbps of packet data to the communication links A, B, and C, respectively, without triggering load balancing. The second routing component may forward 5 Mbps, 5 Mbps, and 3 Mbps of packet data to the communication links A, B, and C, respectively, without triggering load balancing. In this particular example, communication link A is overloaded (11 Mbps of packet data), while communication links B and C have unused capacity that could have prevented overloading of communication link A.

When a communication link is overloaded, data packets may be dropped. This may cause low quality communications between end nodes using the network for the communications (e.g., a video feed, an audio feed, a communication using a connection-less protocol, a user datagram protocol (UDP), and/or the like). In some protocols (e.g., a connection-oriented protocol, transmission control protocol (TCP)) dropped data packets may trigger retransmission of the dropped data packets. This may consume computing resources (e.g., processor resources, memory resources, communication resources, and/or the like) and/or network resources to detect that the data packets were dropped, to request retransmission, to retransmit the dropped data packets, and/or the like.

According to some implementations described herein, a load balancing component of a network device obtains, from a plurality of packet forwarding components of the network device, indications of load balancing metrics (e.g., rates of forwarded packet data) associated with a plurality of communication links. The load balancing component may use the load balancing metrics to determine aggregate load balancing metrics associated with respective communication links of the plurality of communication links. Based on the aggregate load balancing metrics, the load balancing component may determine a load balancing schedule for the plurality of packet forwarding components. The load balancing schedule may indicate traffic distributions for the plurality of packet forwarding components to balance a load of packet data among the plurality of communication links. The load balancing component may provide indications of the traffic distributions to the plurality of packet forwarding components to permit the plurality of packet forwarding components to forward packet data based on the indications of the traffic distributions.

In this way, the load balancing component of the network device may use information from multiple packet forwarding components to determine the load balancing schedule to distribute traffic among the communication links. This may reduce a likelihood of overloading a communication link and dropping data packets. This may improve a quality of communication between end nodes using the network for the communication, conserve computing and/or network resources that may otherwise be used to detect and recover from dropped data packets, and/or the like.

FIGS. 1A-1E are diagrams of one or more example implementations 100 described herein. As shown in FIGS. 1A-1E, the example implementation(s) 100 may include a network device having a load balancing component and a plurality of packet forwarding components, a plurality of intermediate network devices, a target network device, and/or the like. The network device, the plurality of intermediate network devices, the target network device, and/or other included devices may comprise hardware, firmware, or a combination of hardware and software and may include, for example, switches, routers, servers, security devices, devices implementing virtual machines, cloud computing resources, and/or the like. The load balancing component, the plurality of packet forwarding components, and/or other components may comprise hardware, firmware, or a combination of hardware and software and may include, for example, a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component.

As shown in FIG. 1A, and by reference number 102, the plurality of packet forwarding components may forward packet data via a plurality of communication links. In some implementations, the plurality of communication links correspond to communication interfaces of the packet forwarding components. The packet forwarding components may have access to different sets of the plurality of communication links. In some implementations, the packet forwarding components may have access to different quantities of the plurality of communication links. Respective packet forwarding components and/or respective communication links may be associated with different types of packet data, different types of communication requirements, different protocols, and/or the like.

As shown by reference number 104, the load balancing component may obtain indications of load balancing metrics associated with the plurality of communication links. For example, the load balancing component may receive the indications of the load balancing metrics from the plurality of packet forwarding components. The load balancing metrics may include rates of packet data forwarded by the plurality of packet forwarding components via the plurality of communication links, quantities of packets forwarded by the plurality of packet forwarding components via the plurality of communication links (e.g., within a time period), capacities of the communication links, and/or the like.

For example, packet forwarding component 1 may indicate that packet forwarding component 1 forwarded 5 Mbps, 4 Mbps, and 6 Mbps of data packets via a first, second, and third communication links. Packet forwarding component 2 may indicate that packet forwarding component 2 forwarded 3 Mbps, 3 Mbps, and 2 Mbps of data packets via the first, second, and third communication links. Packet forwarding component N may indicate that packet forwarding component N forwarded 3 Mbps, 1 Mbps, and 4 Mbps of data packets via the first, second, and third communication links.

As shown by reference number 106, the load balancing component may determine aggregate load balancing metrics, based on the load balancing metrics, that are associated with respective communication links. The aggregate load balancing metrics may include one or more of total rates of packet data forwarded via respective communication links of the plurality of communication links, total quantities of packets of the packet data that were forwarded via respective communication links of the plurality of communication links, and/or the like. The aggregate load balancing metrics may be associated with a period of time (e.g., about 1 second, 30 seconds, 1 minute, 10 minutes, 30 minutes, 1 hour, 1 day, and/or the like).

In some implementations, the load balancing component may associate the aggregate load balancing metrics and/or the load balancing metrics with a load balancing schedule associated with a period of time associated with the load balancing metrics. In this way, the load balancing component may store a record of load balancing schedules and load balancing results.

Figure 1B:
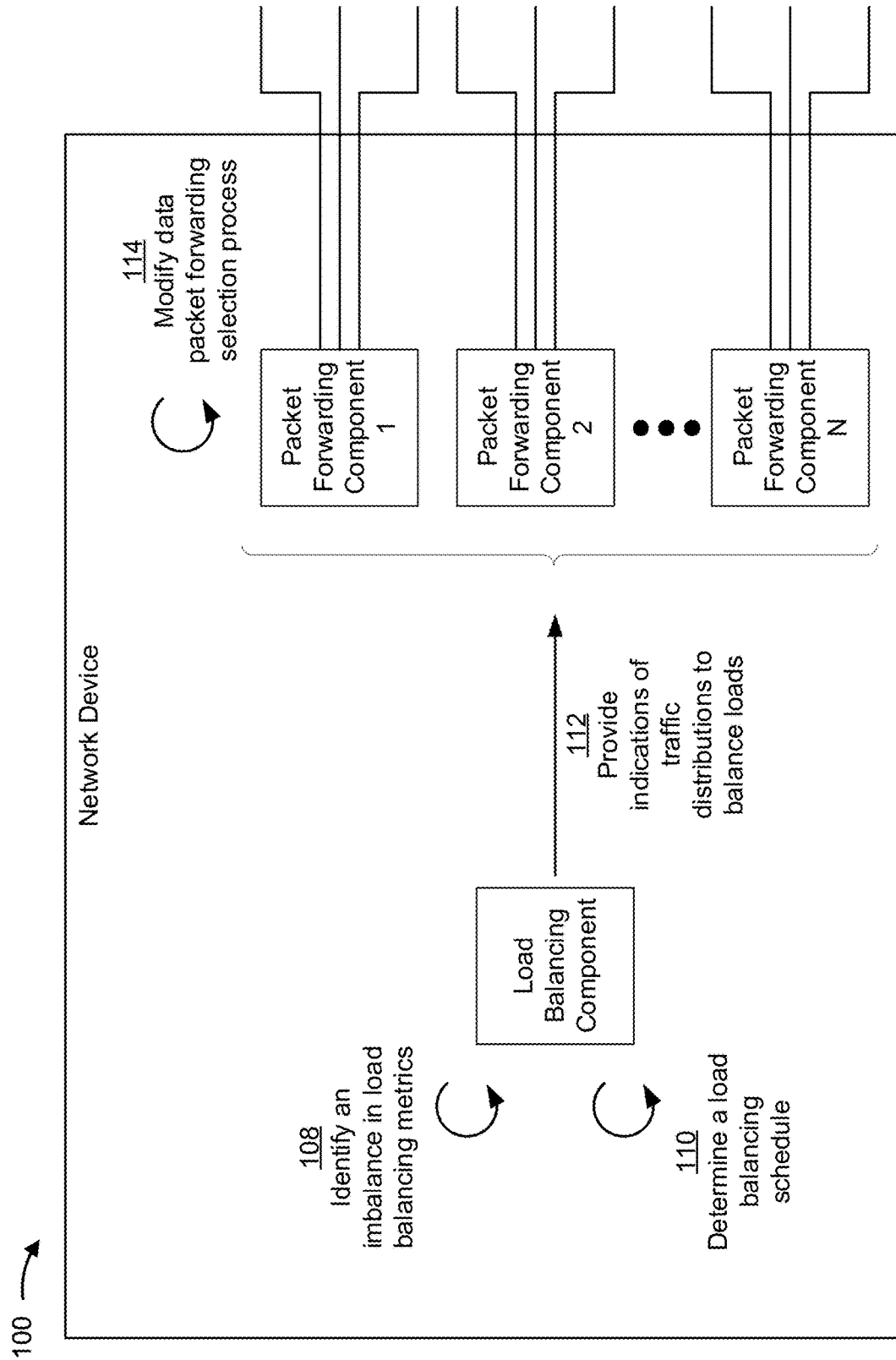

As shown in FIG. 1B, and by reference number 108, the load balancing component may identify an imbalance in load balancing metrics. In some implementations, the load balancing component may identify a first communication link having a first aggregate rate of forwarded packet data that exceeds a second aggregate rate of forwarded packet data of a second communication link by an amount that satisfies a balancing threshold. For example, the load balancing component may be configured with a balancing threshold of 2 Mbps and may determine that a first aggregate rate of forwarded packet data for a first communication link is 9.5 Mbps and that a second aggregate rate of forwarded packet data for a second communication link is 7.0 Mbps. A balancing threshold may be an amount of difference between load balancing metrics for the first communication link and the second communication link that, when satisfied, triggers a rebalancing process.

In some implementations, the load balancing component may determine an imbalance based on one or more of the plurality of communication links having load balancing metrics that satisfy a threshold (e.g., a threshold rate of forwarded packet data). For example, if the first communication link has a capacity of 10 Mbps of data packets, the balancing threshold may be 9 Mbps. In some implementations, the balancing threshold may be configured as a portion of capacity (e.g., 90%) of an associated communication link.

The load balancing component may determine whether the load balancing metrics indicate a load imbalance, and/or if the load imbalance satisfies a balancing threshold, continually or on a periodic basis. For example, the load balancing component may continually monitor the load balancing metrics for a load imbalance, may periodically (e.g., with a 30 second interval, a 5 minute interval, a 30 minute interval, and/or the like) receive the load balancing metrics indicating loads for a time interval, may periodically receive the load balancing metrics indicating loads at a specified time (e.g., a current load, an average load over only a portion of the time interval (e.g., about 1 second), and/or the like). If the load balancing component determines an imbalance, the load balancing component may initiate a balancing process to determine a load balancing schedule based on the imbalance.

As shown by reference number 110, the load balancing component may determine a load balancing schedule. The load balancing schedule may indicate traffic distributions for the plurality of packet forwarding components in a way determined to improve a balance of load balancing metrics during one or more periods of time associated with the load balancing schedule. The load balancing schedule may reduce a likelihood of overloading a communication link.

In some implementations, the load balancing component may use one or more machine learning processes to determine a load balancing schedule. For example, the load balancing component may use one or more artificial intelligence techniques, such as machine learning, deep learning, and/or the like to determine a load balancing schedule. The load balancing component may perform the one or more machine learning processes in connection with, or independently from, one or more of the techniques described above.

In some implementations, the load balancing component may determine a load balancing schedule using one or more inputs such as the indications of the load balancing metrics, a load balancing schedule associated with (e.g., in force during) a time period during which the load balancing metrics were obtained (e.g., measured), a time of day, a day of the week, a date, and/or the like. The load balancing component may train a scheduling model using information that includes historical load balancing schedules and associated parameters such as load balancing metrics associated with the historical load balancing schedules, changes made between the historical load balancing schedules and a preceding load balancing schedule, and/or the like to determine a load balancing schedule. As an example, the load balancing component may determine that historical load balancing schedules are associated with a threshold probability of balancing a load among the plurality of communication links for a time period based on load balancing metrics associated with the historical load balancing schedules, load balancing metrics of a previous time period preceding (e.g., immediately preceding) the time period, and/or the like.

In some implementations, the load balancing component may use a scoring system (e.g., with relatively high scores and/or relatively low scores) to identify and/or classify parameters (e.g., inputs, combinations of inputs, and or the like) as being associated with one another. In this case, the load balancing component may determine that a relatively high score (e.g., as being likely to influence a load balancing metric for a historical time period) is to be assigned to parameters that are determined to be the same or similar as previously identified parameters that influenced a load balancing metric for the historical time period. In contrast, the load balancing component may determine that a relatively low score (e.g., as being unlikely to influence a load balancing metric for a historical time period) is to be assigned to parameters that are determined to be different than previously identified parameters that influenced a load balancing metric for a historical time period.

In some implementations, the load balancing component may perform a training operation when generating the scheduling model. For example, the load balancing component may portion historical load balancing metrics and associated parameters into a training set (e.g., a set of data to train the scheduling model), a validation set (e.g., a set of data used to evaluate a fit of the scheduling model and/or to fine tune the scheduling model), a test set (e.g., a set of data used to evaluate a final fit of the scheduling model), and/or the like. In some implementations, the load balancing component may preprocess and/or perform dimensionality reduction to reduce the historical load balancing metrics and the associated parameters to a minimum feature set. In some implementations, the load balancing component may train the scheduling model on this minimum feature set, thereby reducing processing to train the scheduling model, and may apply a classification technique to the minimum feature set.

In some implementations, the load balancing component may use a classification technique, such as a logistic regression classification technique, a random forest classification technique, a gradient boosting machine learning (GBM) technique, and/or the like, to determine a categorical outcome (e.g., that, based on historical load balancing metrics, a historical load balancing schedule results in a balanced load, that a historical load balancing schedule results in no overloaded communication links or a reduced quantity of overloaded communication links, and/or the like). Additionally, or alternatively, the load balancing component may use a naïve Bayesian classifier technique. In this case, the load balancing component may perform binary recursive partitioning to split the data of the minimum feature set into partitions and/or branches and use the partitions and/or branches to perform predictions (e.g., that, based on historical load balancing metrics, a parameter associated with a historical load balancing schedule will result in a balanced load, that a historical load balancing schedule will result in no overloaded communication links or a reduced quantity of overloaded communication links, and/or the like). Based on using recursive partitioning, the load balancing component may reduce utilization of computing resources relative to manual, linear sorting and analysis of data items, thereby enabling use of thousands, millions, or billions of data items to train a model, which may result in a more accurate model than using fewer data items.

Additionally, or alternatively, the load balancing component may use a support vector machine (SVM) classifier technique to generate a non-linear boundary between data items in the training set. In this case, the non-linear boundary is used to classify test data (e.g., historical load balancing metrics, historical load balancing schedules, associated parameters, and/or the like) into a particular class (e.g., a class indicating that, based on historical load balancing parameters, a parameter associated with a historical load balancing schedule will result in a balanced load, that a historical load balancing schedule will result in no overloaded communication links or a reduced quantity of overloaded communication links, and/or the like).

Additionally, or alternatively, the load balancing component may train the scheduling model using a supervised training procedure that includes receiving input to the scheduling model from a subject matter expert, which may reduce an amount of time, an amount of processing resources, and/or the like to train the scheduling model relative to an unsupervised training procedure. In some implementations, the load balancing component may use one or more other model training techniques, such as a neural network technique, a latent semantic indexing technique, and/or the like. For example, the load balancing component may perform an artificial neural network processing technique (e.g., using a two-layer feedforward neural network architecture, a three-layer feedforward neural network architecture, and/or the like) to perform pattern recognition with regard to patterns of whether parameters associated with historical load balancing schedules will result in balanced loads, whether historical load balancing schedules will result in no overloaded communication links or a reduced quantity of overloaded communication links, and/or the like. In this case, using the artificial neural network processing technique may improve an accuracy of the scheduling model generated by the load balancing component by being more robust to noisy, imprecise, or incomplete data, and by enabling the load balancing component to detect patterns and/or trends undetectable to human analysts or systems using less complex techniques.

As an example, the load balancing component may use a supervised multi-label classification technique to train the scheduling model. For example, as a first step, the load balancing component may map parameters to load balancing schedules that result in a balanced load, a reduced quantity of overloaded communication links, and/or the like. For example, the load balancing component may identify parameters in a particular historical load balancing schedule that achieved balance based on load balancing metrics of a preceding period of time, a load balancing schedule of the preceding period of time, a change from the load balancing schedule of the preceding period of time to the particular historical load balancing schedule, load balancing metrics of the period of time of the particular historical load balancing schedule, and/or the like. In this case, the parameters may be characterized as corresponding to achieving a balanced load, based on characteristics of the parameters (e.g., whether the parameters associated with historical load balancing schedules will result in balanced loads, whether historical load balancing schedules will result in no overloaded communication links or a reduced quantity of overloaded communication links, and/or the like) and an analysis of the parameters (e.g., by a technician, thereby reducing processing relative to the load balancing component being required to analyze each activity).

As a second step, the load balancing component may determine classifier chains, whereby labels of target variables may be correlated (e.g., in this example, labels may be parameters or changes in historical load balancing schedules, and correlation may refer to a common characteristic of the parameters or changes that resulted in balanced loads, no overloaded communication links or a reduced quantity of overloaded communication links, and/or the like). In this case, the load balancing component may use an output of a first label as an input for a second label (as well as one or more input features, which may be other data relating to load balancing metrics), and may determine a likelihood that particular parameters that include a set of characteristics (some of which are associated with balanced loads, a reduced quantity of overloaded communication links, and/or the like) are associated based on a similarity to other parameters that include similar characteristics. In this way, the load balancing component transforms classification from a multilabel-classification problem to multiple single-classification problems, thereby reducing processing utilization.

As a third step, the load balancing component may determine a Hamming loss metric relating to an accuracy of a label in performing a classification by using the validation set of the data. For example, an accuracy with which a weighting is applied to each parameter and whether a corresponding historical load balancing schedule is associated with a balanced load, a reduced quantity of overloaded communication links, and/or the like. As a fourth step, the load balancing component may finalize the scheduling model based on labels that satisfy a threshold accuracy associated with the Hamming loss metric and may use the scheduling model for subsequent determination of load balancing schedules.

As another example, the load balancing component may determine, using a linear regression technique, that a threshold percentage of parameters, in a set of parameters, do not correspond to determining whether a load balancing schedule will reduce a likelihood of overloading communication links, based on associated load balancing metrics, and may determine that those parameters are to receive relatively low association scores. In contrast, the load balancing component may determine that another threshold percentage of parameters correspond to whether a load balancing schedule will reduce a likelihood of overloading communication links and may assign a relatively high association score to those parameters. Based on the parameters corresponding to whether a load balancing schedule will reduce a likelihood of overloading communication links, the load balancing component may generate the scheduling model and may use the scheduling model for analyzing new parameters that the load balancing component identifies.

In some implementations, a different device, such as a server device, may generate and train the scheduling model. The different device may send the scheduling model for use by the load balancing component. The different device may update and send (e.g., on a scheduled basis, on an on-demand basis, on a triggered basis, on a periodic basis, and/or the like) the scheduling model to the load balancing component.

Accordingly, the load balancing component may use any number of artificial intelligence techniques, machine learning techniques, deep learning techniques, and/or the like to determine a load balancing schedule.

As shown by reference number 112, the load balancing component may provide indications of traffic distributions to balance loads. For example, the load balancing component may provide indications of the traffic distributions to the plurality of packet forwarding components to permit the plurality of packet forwarding components to forward packet data based on the indications of the traffic distributions. In some implementations, the load balancing component may provide the indication of traffic distributions via a control plane.

In some implementations, the load balancing component may provide the indications by sending portions of the indications to different packet forwarding components. For example, the load balancing component may provide, to the packet forwarding component 1, indications to shift one or more data flows from a first communication link to a second communication link. The load balancing component may also provide, to the packet forwarding component 2, indications to shift one or more data flows from a second communication link to a third communication link. In some implementations, the load balancing component may not provide indications for the packet forwarding component 1 to the packet forwarding component N. For example, the load balancing component may only provide indications that are relevant to the packet forwarding component to which the load balancing component provides the indications.

As shown by reference number 114, one or more of the plurality of packet forwarding components may modify a data packet forwarding selection process based on the indications of the traffic distributions. In some implementations, one or more of the plurality of packet forwarding components may modify portions of packet data to forward via respective communication links of the plurality of communication links. In some implementations, one or more of the plurality of packet forwarding components may change from a first communication link to a second communication link for forwarding packet data of one or more data flows.

By modifying the data packet forwarding selection process based on the indications of the traffic distributions as determined by the load balancing component with visibility into loads of communication links as provided by multiple packet forwarding components, the packet forwarding components may have an improved likeliness to forward data packets without overloading the communication links. This may avoid consuming computing and/or network resources to detect and recover from dropped data packets.

Figure 1C:
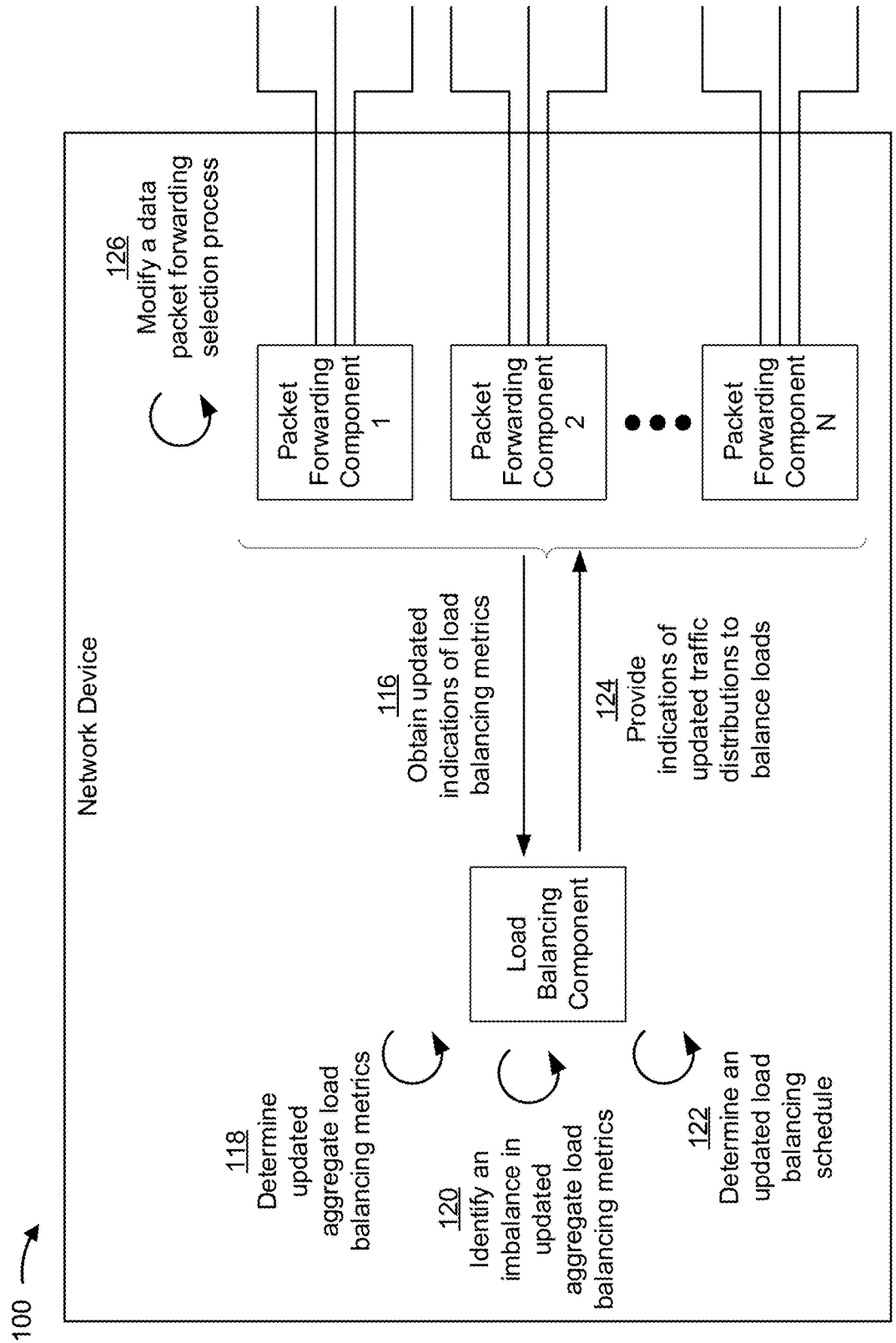

As shown in FIG. 1C, and by reference number 116, the load balancing component may obtain updated indications of load balancing metrics. For example, the load balancing component may receive updated indications of load balancing metrics (e.g., rates of forwarded packet data associated with the plurality of communication links) that are associated with the provided indications of traffic distributions.

As shown by reference number 118, the load balancing component may determine updated aggregate load balancing metrics. For example, the load balancing component may determine, based on the updated indications of rates of forwarded packet data, updated aggregate rates of forwarded packet data associated with respective communication links of the plurality of communication links.

As shown by reference number 120, the load balancing component may identify an imbalance in the updated aggregate load balancing metrics. As described above, the load balancing component may identify the imbalance based on determining that a first aggregate rate of forwarded packet data of a first communication link exceeds a second aggregate rate of forwarded packet data of a second communication link by an amount that satisfies a balancing threshold. In some implementations, the load balancing component may identify the imbalance based on determining that a communication link of the plurality of communication links has a rate of forwarded packet data that satisfies a threshold rate of forwarded packet data.

As shown by reference number 122, the load balancing component may determine an updated load balancing schedule that may indicate updated traffic distributions. In some implementations, the load balancing component may determine the updated load balancing schedule based on (e.g., in response to) identifying the imbalance in the updated aggregate load balancing metrics. The load balancing component may use the scheduling model to determine the load balancing schedule to reduce a likelihood of overloading one or more of the plurality of communication links.

As shown by reference number 124, the load balancing component may provide indications of updated traffic distributions in order to balance loads. For example, the load balancing component may provide indications of the traffic distributions to the plurality of packet forwarding components to permit the plurality of packet forwarding components to forward packet data based on the indications of the traffic distributions.

As shown by reference number 126, the plurality of packet forwarding components may modify a data packet forwarding selection process based on the indications of updated traffic distributions. In some implementations, one or more of the plurality of packet forwarding components may modify portions of packet data to forward via respective communication links of the plurality of communication links. In some implementations, one or more of the plurality of packet forwarding components may change from a first communication link to a second communication link for forwarding packet data of one or more data flows.

Figure 1D:
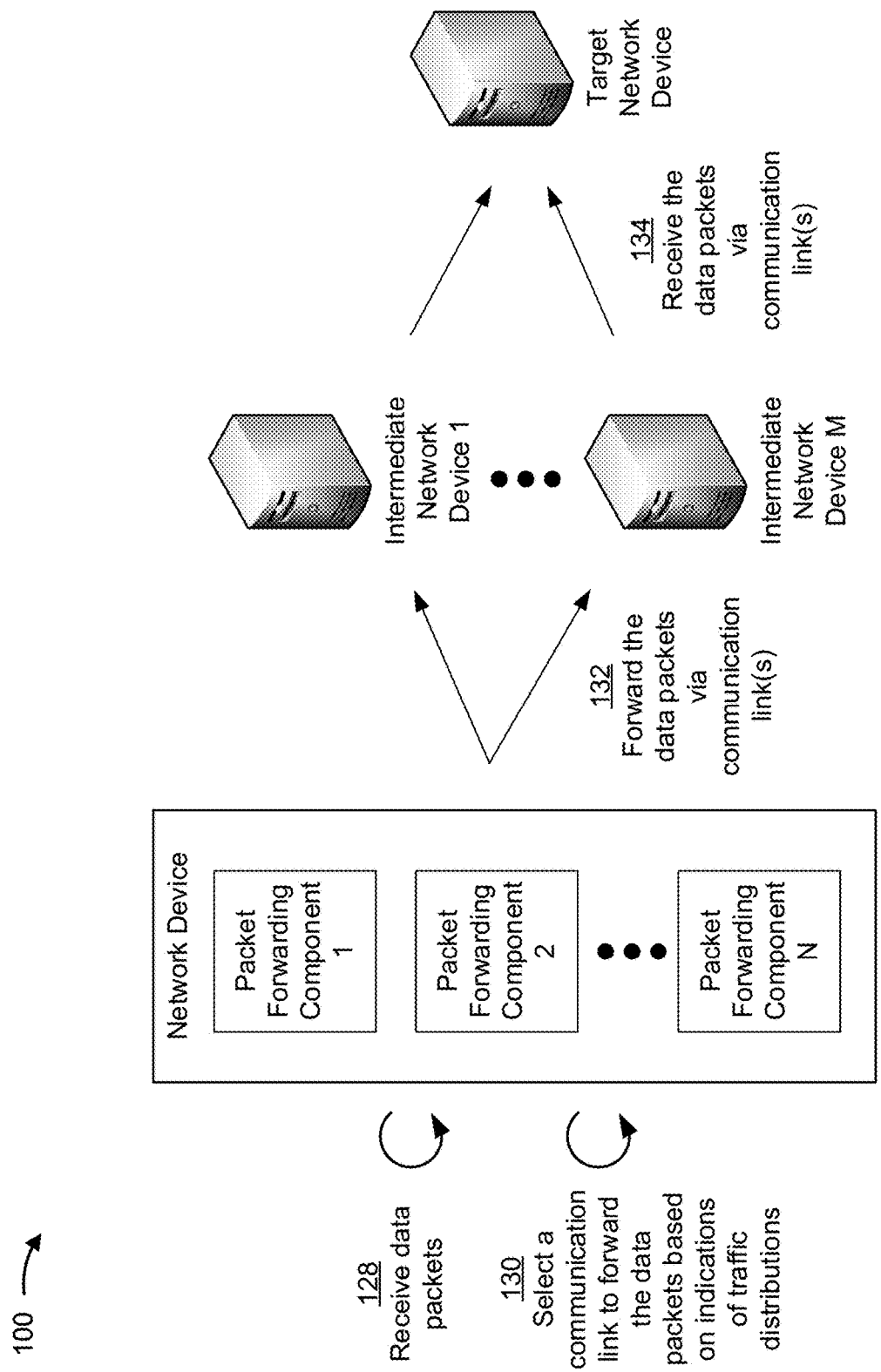

As shown in FIG. 1D, and by reference number 128, the network device may receive data packets. For example, the network device may receive data packets from another network, another network device within the network, and/or the like. The network device may determine a target network device for the data packets (e.g., from headers of the data packets, labels of the data packets, and/or the like). In some implementations, the target network device may be a next hop on a path through the network as indicated by the data packets.

As shown by reference number 130, the plurality of packet forwarding components of the network device may select a communication link to forward the data packets based on the indication of the traffic distributions. In some implementations, the indications of the traffic distributions modify a selection process such as a random selection process, a semi-random selection process based on attributes of the data packets, a selection process based on times at which the packet forwarding component receives data packets, another process intended to distribute the data packets among the plurality of communication links, and/or the like. For example, the indications of the traffic distributions may modify probabilities of selecting associated communication links using a random selection process, a semi-random selection process based on attributes of the data packets, a selection process based on times at which the packet forwarding component receives data packets, and/or the like.

As shown by reference number 132, the network device, using the plurality of packet forwarding components, forwards the data packets via one or more communication links to one or more intermediate network devices 1 through M. The intermediate network devices 1 through M may be along various paths to the target network device.

As shown by reference number 134, the target network device may receive the data packets via one or more communication links between the target network device and the one or more intermediate network devices 1 through M. In some implementations, the intermediate network devices 1 through M also have load balancing components to balance loads across a plurality of packet forwarding components. This may improve a likelihood that the target network device receives the data packets without the network dropping one or more of the data packets based on overloading communication links. This can conserve computing resources and/or network resources that may otherwise be consumed by detecting and recovering from dropped data packets. In some implementations, this may also improve connection qualities for connections over the network.

Figure 1E:
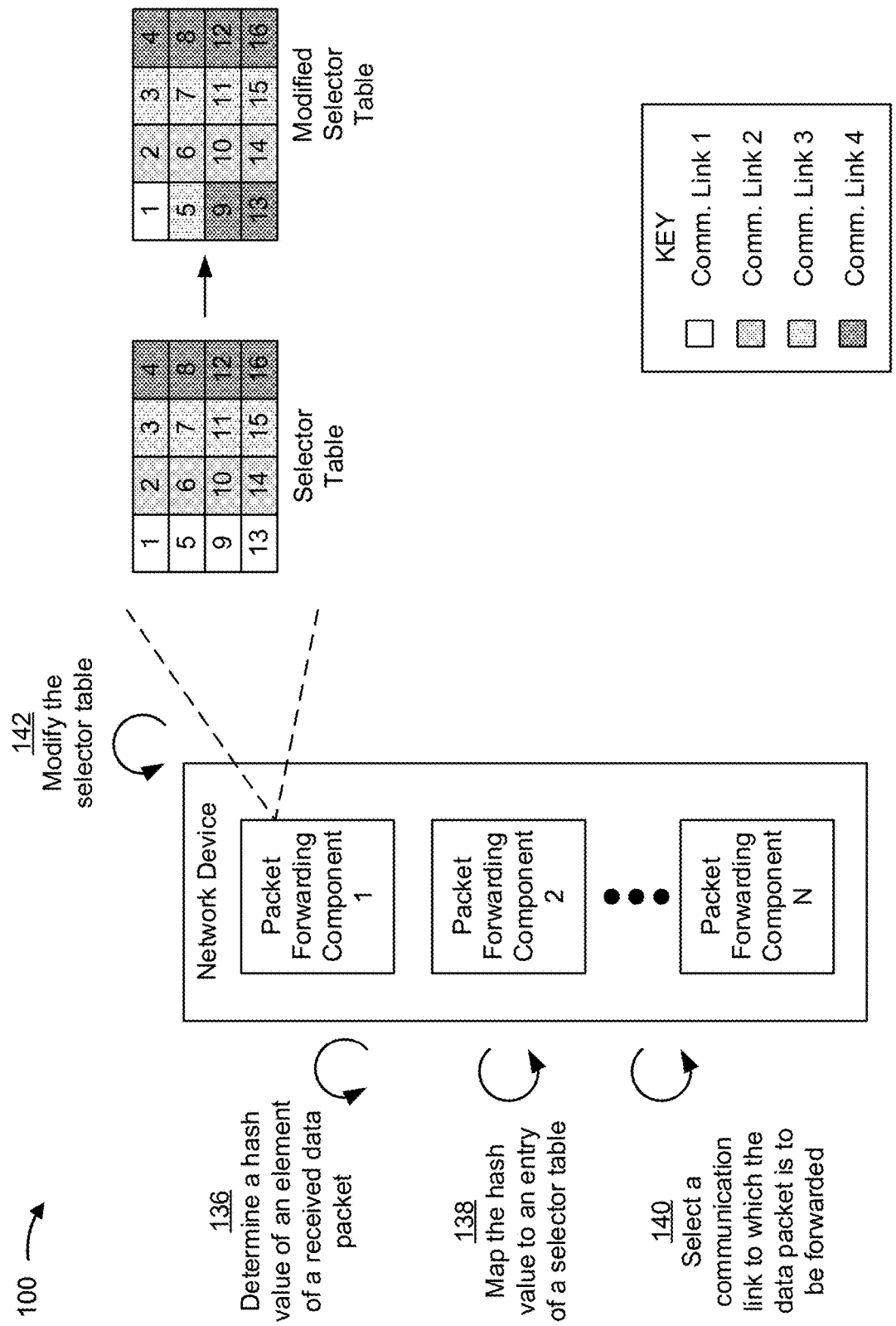

As shown by FIG. 1E, and by reference number 136, the network device may perform a packet forwarding selection process that includes determining a hash value of an element of a received data packet. In some implementations, packet forwarding component 1 may perform a hashing process on a header, a label (e.g., a multiprotocol label switching (MPLS) label), and/or the like to obtain a hash value of the received data packet. The hashing process may include parameters to compel a hash value output to correspond to a value of a selector table of the packet forwarding component 1. For example, the selector table may assign values to entries within the selector table and may compel the hash value to be within a range of values of the selector table. In some implementations, the packet forwarding component 1 may translate any hash value of the received data packet into a value within the range of values of the selector table.

In some implementations, the hashing process may be configured to obtain the same hash value for data packets of the same data flow (e.g., data packets of a continuing data stream). For example, the hashing process may hash a portion of the data packet that indicates a source, a portion of the data packet that indicates a destination, and/or the like.

As shown by reference number 138, the network device may map the hash value to an entry of the selector table. For example, the selector table shown includes entries labeled 1 through 16. The packet forwarding component 1 may map the hash value to a number between 1 and 16 and to the corresponding entry of the selector table.

As shown by reference number 140, the network device may select a communication link to which the data packet is to be forwarded. For example, the packet forwarding component 1 may select a communication link based on association of the selected link to the entry of the selector table to which the hash value is mapped. As shown in the selector table, values (e.g., the hash value or a value mapped to the hash value) 1, 5, 9, and 13 correspond to communication link 1, values 2, 6, 10, and 14 correspond to communication link 2, values 3, 7, 11, and 15 correspond to communication link 3, values 4, 8, 12, and 16 correspond to communication link 4.

If the hashing process results in semi-random assignments of data packets to communication links, the quantity of data packets assigned to each communication link will generally be balanced. However, if a first data packet of each new data flow is assigned to communication links semi-randomly (e.g., based on hash values, times at which the data packets are receive, and/or the like), imbalances may occur when long data flows are repeatedly assigned to the same communication link along with a generally equal share of new data flows. Additionally, or alternatively, the nature of randomness or semi-randomness allows for unintentionally assigning imbalanced shares of data packets to the entries in the selector table and the corresponding communication links.

As shown by reference number 142, the network device may modify the selector table. For example, the load balancing component may provide the indications of traffic distributions to the packet forwarding component 1 to cause the packet forwarding component 1 to modify the selector table.

One or more of the indications of the traffic distributions may indicate a modification of the selector table to modify portions of packet data to forward via the communication links. For example, an indication may indicate that packet forwarding component 1 is to change a quantity of entries of the selector table that correspond to the different communication links. As shown in the modified selector table, communication link 1 corresponds to only $\frac{1}{16}$ of the entries of the modified selector table and may be expected to forward only $\frac{1}{16}$ of the received data packets via communication link 1. This may be because the load balancing metrics indicated to the load balancing component that communication link 1 is overloaded, has a load that is greater than a load of another communication link by an amount that exceeds a threshold, and/or the like. Additionally, the modified selector table shows that communication link 2 corresponds to $\frac{4}{16}$ of the entries, communication link 3 corresponds to $\frac{5}{16}$ of the entries, and communication link 4 corresponds to $\frac{6}{16}$ of the entries. This may be because communication link 2 is at or near a desired load and does not need to be modified, communication link 3 is slightly underloaded, and communication link 4 is underloaded by more than communication link 3.

One or more of the indications of the traffic distributions may indicate a modification of the selector table to change communication links for forwarding packet data of one or more data flows. For example, the indication may indicate that the entry labeled "5" is to be changed from corresponding to communication link 1 to corresponding to communication link 3. This may be because one or more traffic flows that produce hash values that map to the entry labeled "5" should be moved to communication link 3 to improve load balance. In some examples, the one or more traffic flows may be long data flows that have caused an overload of communication link 1.

By using the indications of traffic distributions to modify the selector tables of packet forwarding components, the network device may efficiently provide instructions to modify a balance within respective packet forwarding components. By using the load balancing component to provide the instructions to the packet forwarding components, the network device may improve load balancing of a plurality of communication links among a plurality of packet forwarding components. This may reduce a quantity of dropped packets from packet forwarding components unknowingly overloading one or more of the communication links. Reducing the quantity of dropped packets may improve a quality of communication between end nodes using the network for the communication, conserve computing and/or network resources that may otherwise be used to detect and recover from dropped data packets, and/or the like.

As indicated above, FIGS. 1A-1E are provided merely as one or more examples. Other examples may differ from what is described with regard to FIGS. 1A-1E.

Figure 2:
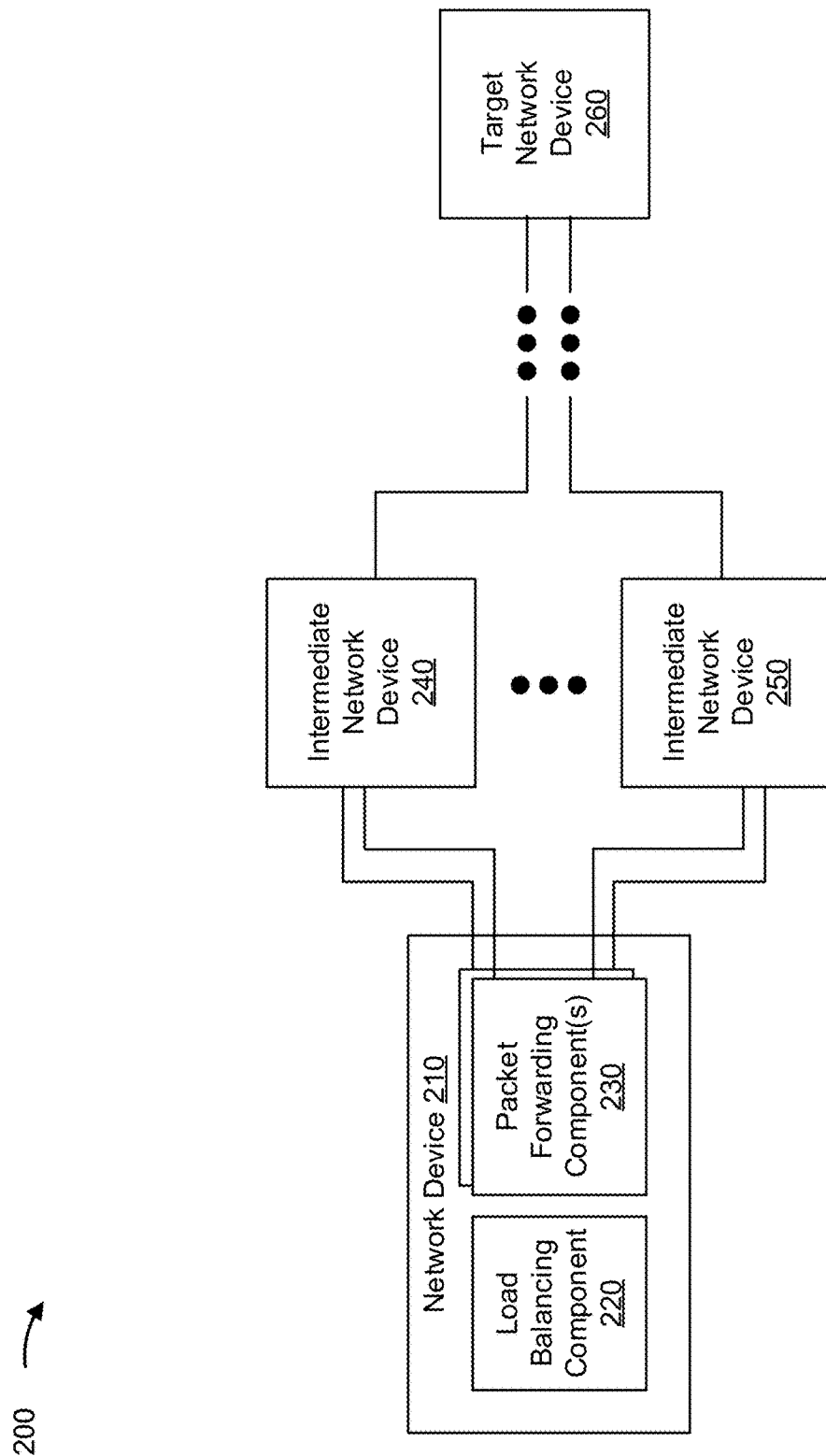
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network device 210, load balancing component 220, packet forwarding components 230, intermediate network device 240 through intermediate network device 250, and target network device 260. Devices of environment 200 may interconnect via wired connections, wireless connections, or a combination of wired and wireless connections.

Network device 210 includes one or more devices capable of receiving, storing, generating, processing, forwarding, and/or transferring information. For example, network device 210 may include a router, a switch (e.g., a top-of-rack (TOR) switch), a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, network device 210 may be a physical device implemented within a housing, such as a chassis. In some implementations, network device 210 may be a virtual device implemented by one or more computer devices of a cloud computing environment or a data center. In some implementations, network device 210 may communicate with intermediate network device 240 through intermediate network device 250 via a plurality of communication links. Network device 210 may comprise load balancing component 220 and plurality of packet forwarding components 230.

Load balancing component 220 includes one or more devices capable of receiving, storing, generating, processing, forwarding, and/or transferring information. For example, load balancing component 220 may include a processor (e.g., a CPU, a GPU, an APU, a microprocessor, a microcontroller, a DSP, an FPGA, an ASIC, or another type of processing component), memory, and/or a storage component. In some implementations, load balancing component 220 receives indications of load balancing metrics from packet forwarding components 230, stores the load balancing metrics, processes the load balancing metrics and/or previously received load balancing metrics, generates a load balancing schedule, and/or provides indications of traffic distributions to packet forwarding components 230.

Packet forwarding component 230 includes one or more devices capable of receiving, storing, generating, processing, forwarding, and/or transferring information. For example, packet forwarding component 230 may include a processor (e.g., a CPU, a GPU, an APU, a microprocessor, a microcontroller, a DSP, an FPGA, an ASIC, or another type of processing component), memory, and/or a storage component. In some implementations, packet forwarding component 230 provides indications of load balancing metrics to load balancing component 220, receives indications of traffic distributions, and forwards data packets, using one or more of a plurality of communication links, to one or more of intermediate network device 240 through intermediate network device 250.

Intermediate network device 240 through intermediate network device 250 comprise a plurality of network devices along a variety of paths between network device 210 and target network device 260. Intermediate network device 240 through intermediate network device 250 include a plurality of devices capable of receiving, storing, generating, processing, forwarding, and/or transferring information. For example, intermediate network device 240 through intermediate network device 250 may include one or more of a router, a switch (e.g., top-of-rack (TOR) switch), a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, intermediate network device 240 through intermediate network device 250 may be physical devices implemented within housings, such as chasses. In some implementations, intermediate network device 240 through intermediate network device 250 may be virtual devices implemented by one or more computer devices of a cloud computing environment or a data center. Intermediate network device 240 through intermediate network device 250 may comprise load balancing components and pluralities of packet forwarding components.

Target network device 260 comprises a plurality of devices capable of receiving, storing, generating, processing, forwarding, and/or transferring information. For example, target network device 260 may include one or more of a router, a switch (e.g., top-of-rack (TOR) switch), a gateway, a firewall device, a modem, a hub, a bridge, a network interface controller (NIC), a reverse proxy, a server (e.g., a proxy server), a multiplexer, a security device, an intrusion detection device, a load balancer, or a similar device. In some implementations, target network device 260 may be a physical device implemented within a housing, such as a chassis. In some implementations, target network device 260 may be a virtual device implemented by one or more computer devices of a cloud computing environment or a data center. Target network device 260 may comprise load balancing components and pluralities of packet forwarding components.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
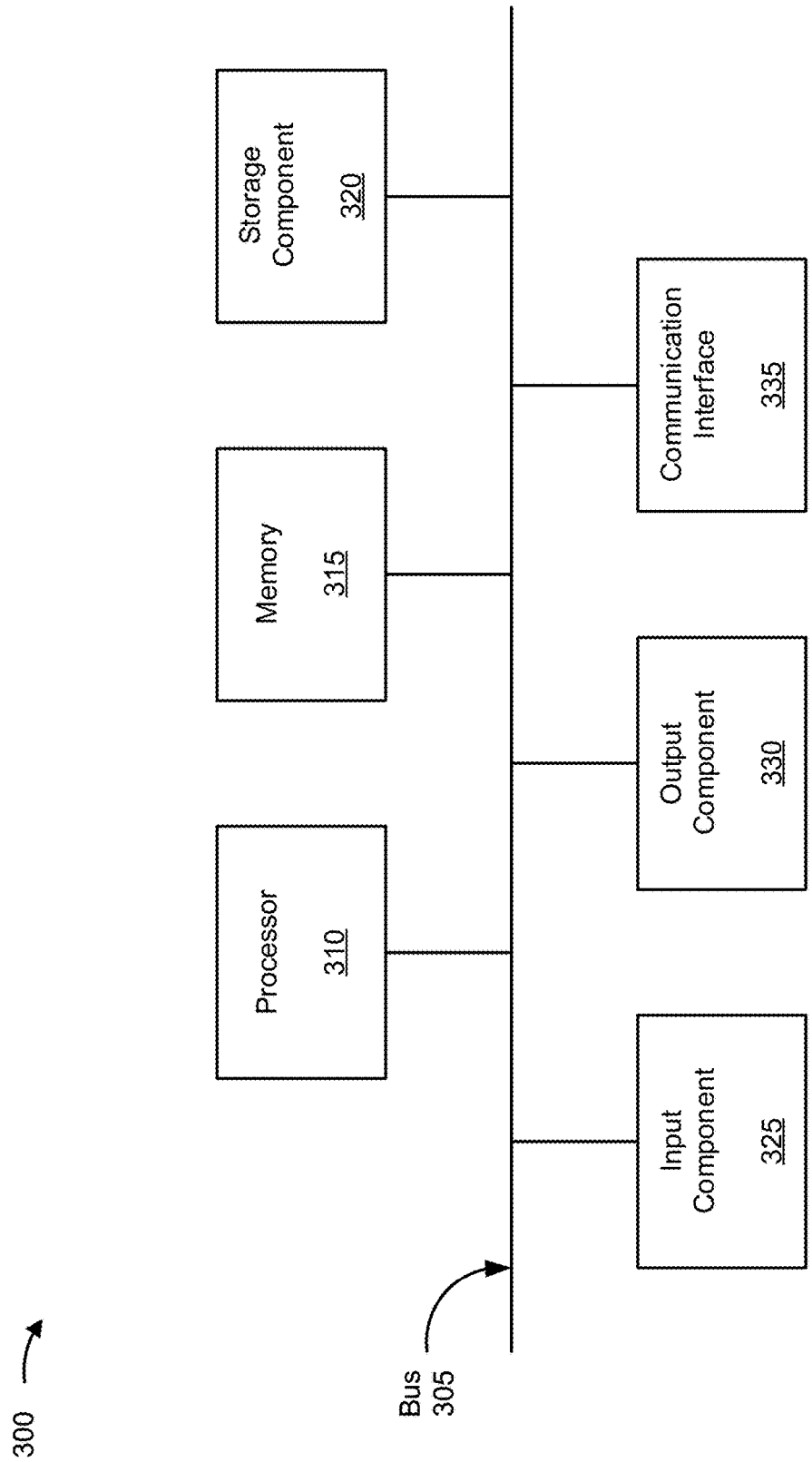
FIGS. 3A and 3B are diagrams of example components of one or more devices of FIG. 2.
Figure 3B:
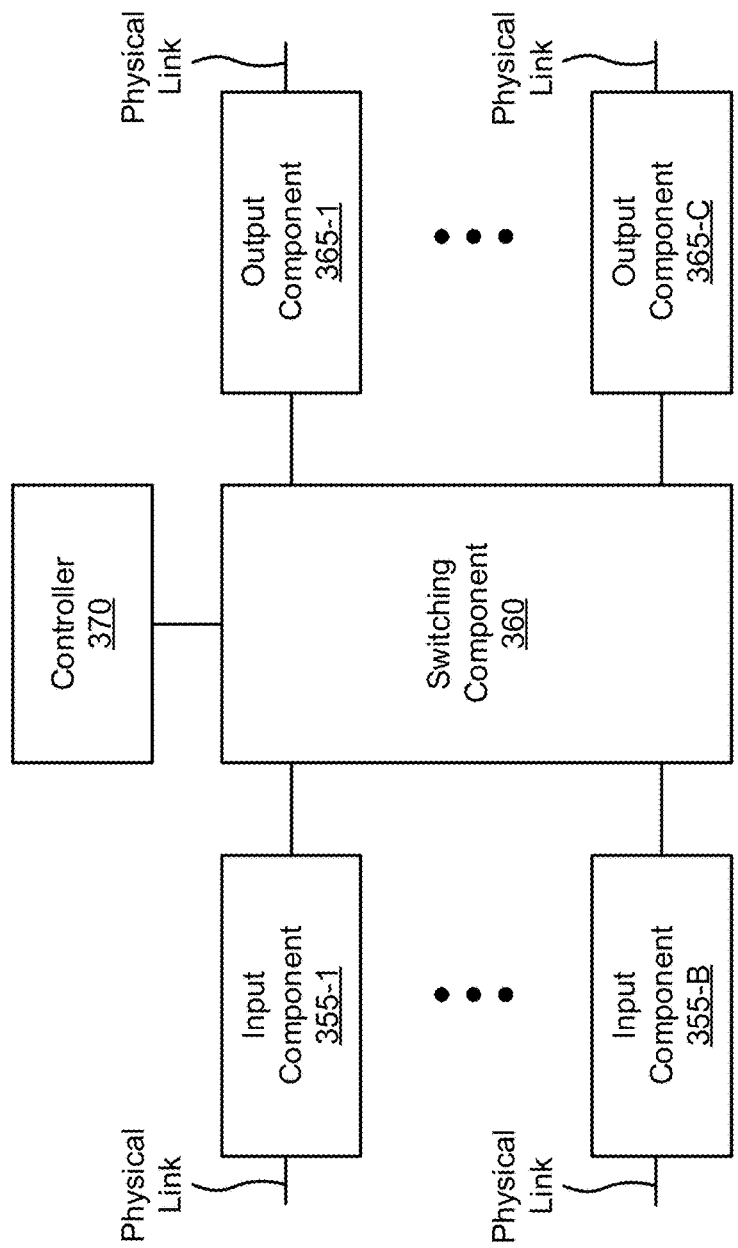

FIGS. 3A-3B are diagrams of example components of one or more devices of FIG. 2. FIG. 3A is a diagram of example components of a device 300. Device 300 may correspond to network device 210, load balancing component 220, packet forwarding components 230, intermediate network device 240 through intermediate network device 250, and/or target network device 260. In some implementations, network device 210, load balancing component 220, packet forwarding components 230, intermediate network device 240 through intermediate network device 250, and/or target network device 260 may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to network device 210, load balancing component 220, packet forwarding components 230, intermediate network device 240 through intermediate network device 250, and/or target network device 260. In some implementations, network device 210, load balancing component 220, packet forwarding components 230, intermediate network device 240 through intermediate network device 250, and/or target network device 260 may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical links and may be points of entry for incoming traffic, such as packets. Input component 355 may process incoming traffic, such as by performing data link layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical links. Output component 365 may support data link layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, and/or the like) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4:
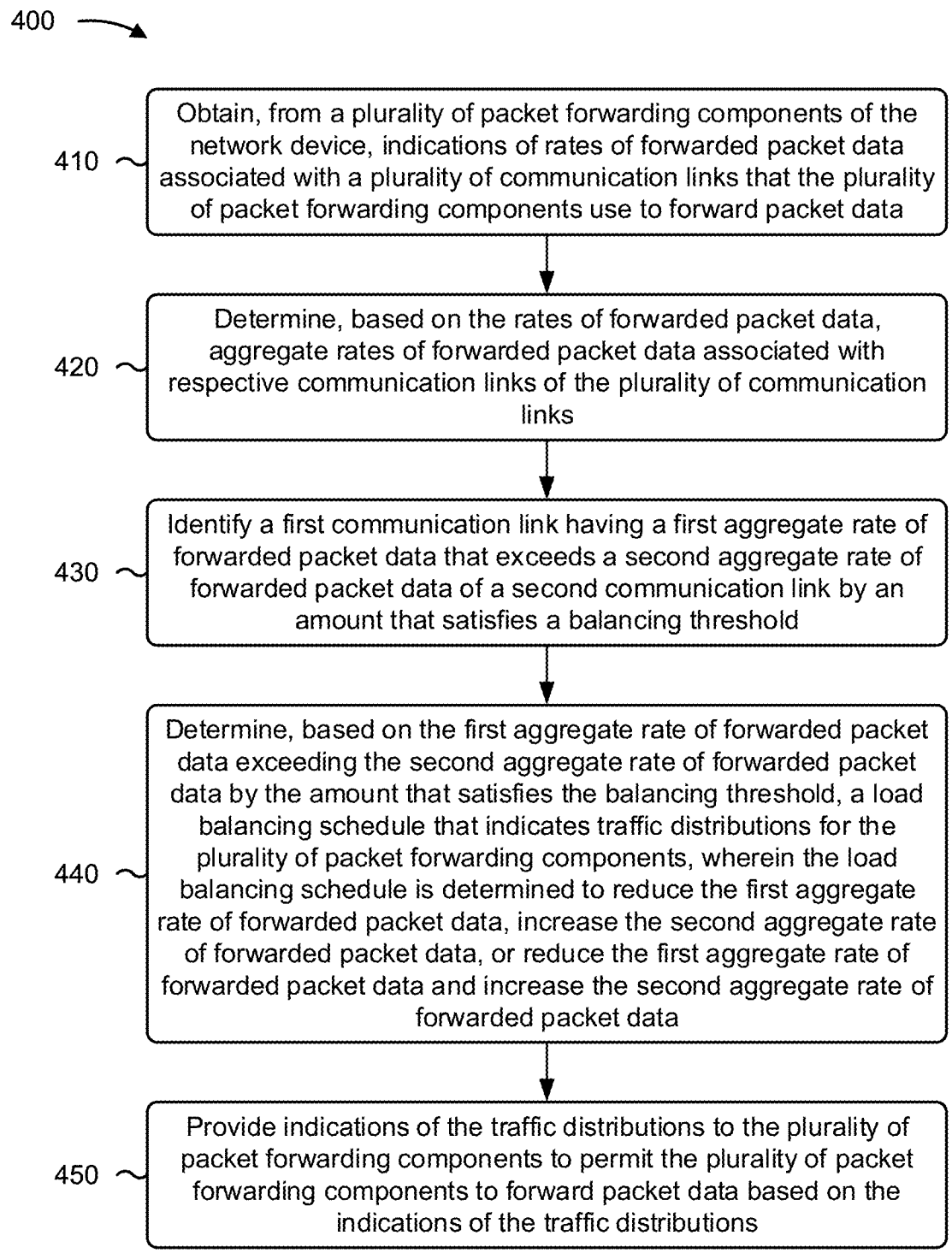
FIGS. 4-6 are flowcharts of example processes for load balancing over a plurality of packet forwarding components.

FIG. 4 is a flow chart of an example process 400 for load balancing over a plurality of packet forwarding components. In some implementations, one or more process blocks of FIG. 4 may be performed by a load balancing component (e.g., load balancing component 220). In some implementations, one or more process blocks of FIG. 4 may be performed by another device or a group of devices separate from or including the load balancing component, such as a network device (e.g., network device 210), a packet forwarding component (e.g., one or more of the plurality of packet forwarding components 230), and/or the like.

As shown in FIG. 4, process 400 may include obtaining, from a plurality of packet forwarding components of the network device, indications of rates of forwarded packet data associated with a plurality of communication links that the plurality of packet forwarding components use to forward packet data (block 410). For example, the load balancing component (e.g., using processor 320, memory 330, storage component 340, input component 350, output component 360, communication interface 370 and/or the like) may obtain, from a plurality of packet forwarding components of the network device, indications of rates of forwarded packet data associated with a plurality of communication links that the plurality of packet forwarding components use to forward packet data, as described above.

As further shown in FIG. 4, process 400 may include determining, based on the rates of forwarded packet data, aggregate rates of forwarded packet data associated with respective communication links of the plurality of communication links (block 420). For example, the load balancing component (e.g., using processor 320, memory 330, storage component 340, input component 350, output component 360, communication interface 370 and/or the like) may determine, based on the rates of forwarded packet data, aggregate rates of forwarded packet data associated with respective communication links of the plurality of communication links, as described above.

As further shown in FIG. 4, process 400 may include identifying a first communication link having a first aggregate rate of forwarded packet data that exceeds a second aggregate rate of forwarded packet data of a second communication link by an amount that satisfies a balancing threshold (block 430). For example, the load balancing component (e.g., using processor 320, memory 330, storage component 340, input component 350, output component 360, communication interface 370 and/or the like) may identify a first communication link having a first aggregate rate of forwarded packet data that exceeds a second aggregate rate of forwarded packet data of a second communication link by an amount that satisfies a balancing threshold, as described above.

As further shown in FIG. 4, process 400 may include determining, based on the first aggregate rate of forwarded packet data exceeding the second aggregate rate of forwarded packet data by the amount that satisfies the balancing threshold, a load balancing schedule that indicates traffic distributions for the plurality of packet forwarding components, wherein the load balancing schedule is determined to reduce the first aggregate rate of forwarded packet data, increase the second aggregate rate of forwarded packet data, or reduce the first aggregate rate of forwarded packet data and increase the second aggregate rate of forwarded packet data (block 440). For example, the load balancing component (e.g., using processor 320, memory 330, storage component 340, input component 350, output component 360, communication interface 370 and/or the like) may determine, based on the first aggregate rate of forwarded packet data exceeding the second aggregate rate of forwarded packet data by the amount that satisfies the balancing threshold, a load balancing schedule that indicates traffic distributions for the plurality of packet forwarding components, as described above. In some implementations, the load balancing schedule is determined to reduce the first aggregate rate of forwarded packet data, increase the second aggregate rate of forwarded packet data, or reduce the first aggregate rate of forwarded packet data and increase the second aggregate rate of forwarded packet data.

As further shown in FIG. 4, process 400 may include providing indications of the traffic distributions to the plurality of packet forwarding components to permit the plurality of packet forwarding components to forward packet data based on the indications of the traffic distributions (block 450). For example, the load balancing component (e.g., using processor 320, memory 330, storage component 340, input component 350, output component 360, communication interface 370 and/or the like) may provide indications of the traffic distributions to the plurality of packet forwarding components to permit the plurality of packet forwarding components to forward packet data based on the indications of the traffic distributions, as described above.

Process 400 may include additional implementations, such as any single implementation or any combination of implementations described below and/or in connection with one or more other processes described elsewhere herein.

In a first implementation, the plurality of communication links provide a variety of paths to another network device.

In a second implementation, alone or in combination with the first implementation, process 400 includes obtaining, from the plurality of packet forwarding components of the network device, updated indications of rates of forwarded packet data associated with the plurality of communication links; determining, based on the updated indications of rates of forwarded packet data, updated aggregate rates of forwarded packet data associated with respective communication links of the plurality of communication links; determining, based on the updated aggregate rates of forwarded packet data, an updated load balancing schedule that indicates updated traffic distributions; and providing, to the plurality of packet forwarding components, indications of the updated traffic distributions to permit the plurality of packet forwarding components to forward packet data based on the updated indications of the updated traffic distributions.

In a third implementation, alone or in combination with one or more of the first and second implementations, an indication of the indications of the traffic distributions indicates, for a particular packet forwarding component of the plurality of packet forwarding components, portions of packet data to forward via respective communication links of the plurality of communication links.

In a fourth implementation, alone or in combination with one or more of the first through third implementations, an indication of the indications of the traffic distributions indicates, for a particular packet forwarding component of the plurality of packet forwarding components, a change from the first communication link to the second communication link for forwarding packet data of one or more data flows.

In a fifth implementation, alone or in combination with one or more of the first through fourth implementations, providing the indications of the traffic distributions to the plurality of packet forwarding components comprises providing the indications to the plurality of packet forwarding components via a control plane.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
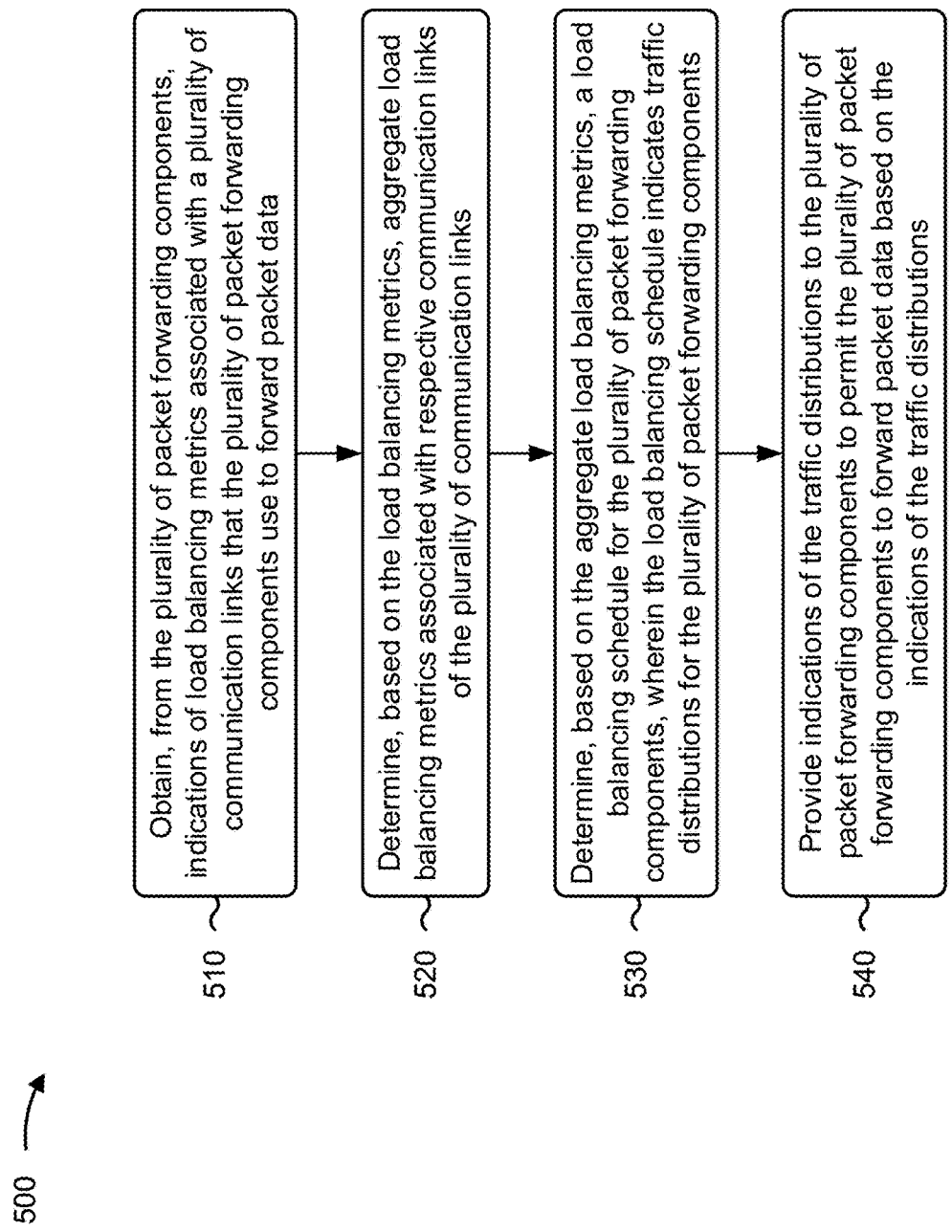

FIG. 5 is a flow chart of an example process 500 for load balancing over a plurality of packet forwarding components. In some implementations, one or more process blocks of FIG. 5 may be performed by a network device (e.g., network device 210). In some implementations, one or more process blocks of FIG. 5 may be performed by another device or a group of devices separate from or including the network device, such as a load balancing component (e.g., load balancing component 220), a packet forwarding component (e.g., one or more of the plurality of packet forwarding components 230), and/or the like.

As shown in FIG. 5, process 500 may include obtaining, from the plurality of packet forwarding components, indications of load balancing metrics associated with a plurality of communication links that the plurality of packet forwarding components use to forward packet data (block 510). For example, the load balancing component (e.g., using processor 320, memory 330, storage component 340, input component 350, output component 360, communication interface 370 and/or the like) may obtain, from the plurality of packet forwarding components, indications of load balancing metrics associated with a plurality of communication links that the plurality of packet forwarding components use to forward packet data, as described above.

As further shown in FIG. 5, process 500 may include determining, based on the load balancing metrics, aggregate load balancing metrics associated with respective communication links of the plurality of communication links (block 520). For example, the load balancing component (e.g., using processor 320, memory 330, storage component 340, input component 350, output component 360, communication interface 370 and/or the like) may determine, based on the load balancing metrics, aggregate load balancing metrics associated with respective communication links of the plurality of communication links, as described above.

As further shown in FIG. 5, process 500 may include determining, based on the aggregate load balancing metrics, a load balancing schedule for the plurality of packet forwarding components, wherein the load balancing schedule indicates traffic distributions for the plurality of packet forwarding components (block 530). For example, the load balancing component (e.g., using processor 320, memory 330, storage component 340, input component 350, output component 360, communication interface 370 and/or the like) may determine, based on the aggregate load balancing metrics, a load balancing schedule for the plurality of packet forwarding components, as described above. In some implementations, the load balancing schedule indicates traffic distributions for the plurality of packet forwarding components.

As further shown in FIG. 5, process 500 may include providing indications of the traffic distributions to the plurality of packet forwarding components to permit the plurality of packet forwarding components to forward packet data based on the indications of the traffic distributions (block 540). For example, the load balancing component (e.g., using processor 320, memory 330, storage component 340, input component 350, output component 360, communication interface 370 and/or the like) may provide indications of the traffic distributions to the plurality of packet forwarding components to permit the plurality of packet forwarding components to forward packet data based on the indications of the traffic distributions, as described above.

Process 500 may include additional implementations, such as any single implementation or any combination of implementations described below and/or in connection with one or more other processes described elsewhere herein.

In a first implementation, the load balancing metrics comprise or more of: rates of packet data forwarded by the plurality of packet forwarding components via the plurality of communication links, or quantities of packets, of the packet data, forwarded by the plurality of packet forwarding components via the plurality of communication links.

In a second implementation, alone or in combination with the first implementation, process 500 includes identifying a first communication link having a first aggregate rate of forwarded packet data that exceeds a second aggregate rate of forwarded packet data of a second communication link by an amount that satisfies a balancing threshold, and determining, based on the first aggregate rate of forwarded packet data exceeding the second aggregate rate of forwarded packet data by the amount that satisfies the balancing threshold, the load balancing schedule to reduce the first aggregate rate of forwarded packet data, increase the second aggregate rate of forwarded packet data, or reduce the first aggregate rate of forwarded packet data and increase the second aggregate rate of forwarded packet data.

In a third implementation, alone or in combination with one or more of the first and second implementations, process 500 includes, when determining the load balancing schedule, identifying one or more of the plurality of communication links having a rate of forwarded packet data that satisfies a threshold rate of forwarded packet data, and determining the load balancing schedule to reduce the rate of forwarded packet data of the one or more of the plurality of communication links.

In a fourth implementation, alone or in combination with one or more of the first through third implementations, process 500 includes: obtaining, from the plurality of packet forwarding components, updated indications of load balancing metrics associated with the plurality of communication links; determining, based on the updated indications of load balancing metrics, updated aggregate load balancing metrics; identifying, based on the updated aggregate load balancing metrics, a first aggregate rate of forwarded packet data of a first communication link that exceeds a second aggregate rate of forwarded packet data of a second communication link by an amount that satisfies a balancing threshold; determining, based on the first aggregate rate of forwarded packet data exceeding the second aggregate rate of forwarded packet data by the amount that satisfies the balancing threshold, an updated load balancing schedule that indicates updated traffic distributions; and providing, to the plurality of packet forwarding components, indications of the updated traffic distributions to the plurality of packet forwarding components to permit the plurality of packet forwarding components to forward packet data based on the indications of the updated traffic distributions.

In a fifth implementation, alone or in combination with one or more of the first through fourth implementations, the plurality of packet forwarding components are to use selector tables to select communication links of the plurality of communication links for forwarding data packets, and an indication of the indications of the traffic distributions indicates, for a particular packet forwarding component of the plurality of packet forwarding components, a modification of an associated selector table to modify portions of packet data to forward via respective communication links of the plurality of communication links.

In a sixth implementation, alone or in combination with one or more of the first through fifth implementations, the plurality of packet forwarding components are to use selector tables to select communication links of the plurality of communication links for forwarding packet data, and an indication of the indications of the traffic distributions indicates, for a particular packet forwarding component of the plurality of packet forwarding components, a modification of an associated selector table to change from a first communication link to a second communication link for forwarding packet data of one or more data flows.

In a seventh implementation, alone or in combination with one or more of the first through sixth implementations, a packet forwarding component, of the plurality of packet forwarding components, is implemented via an application-specific integrated circuit.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
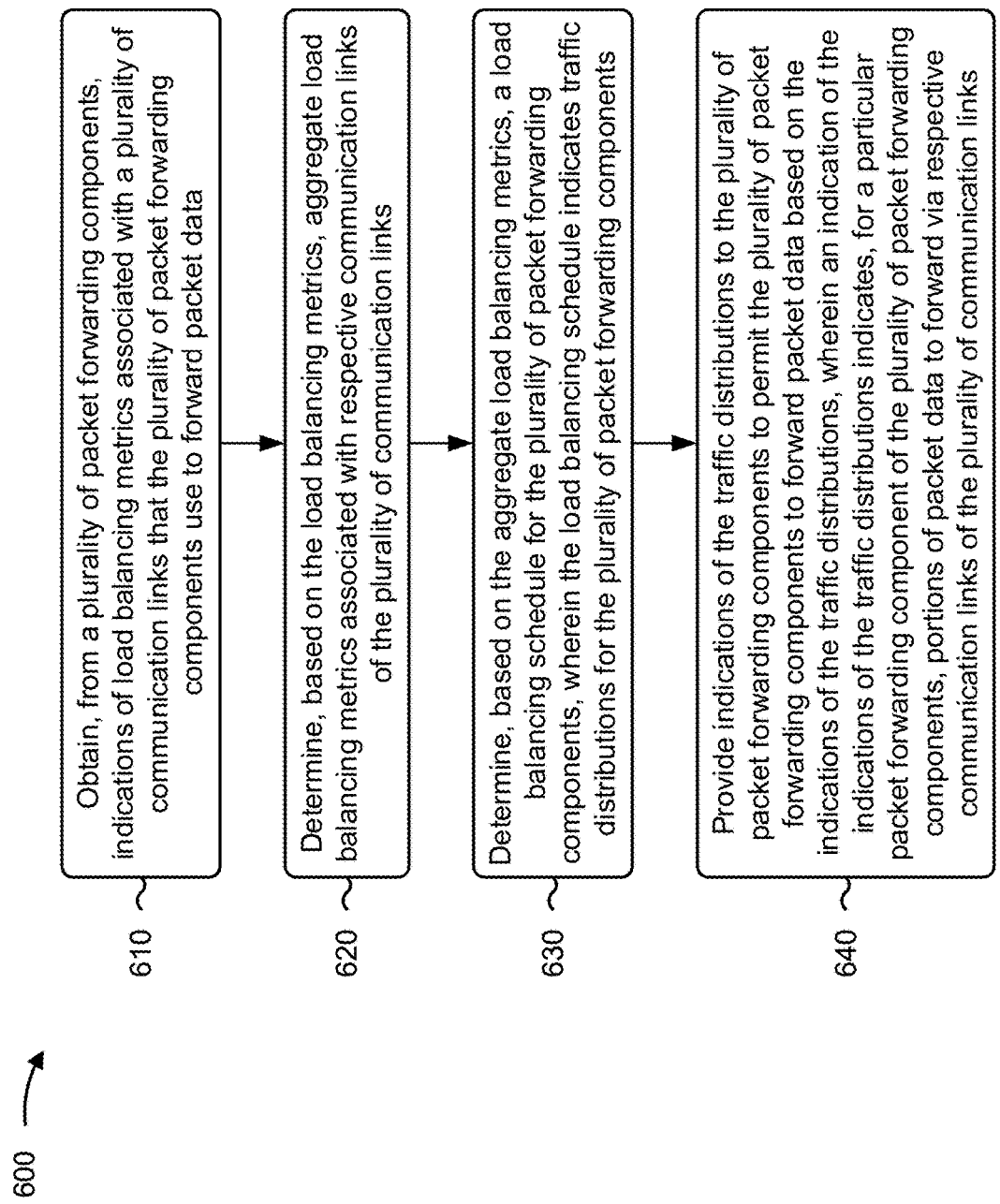

FIG. 6 is a flow chart of an example process 600 for load balancing over a plurality of packet forwarding components. In some implementations, one or more process blocks of FIG. 6 may be performed by a load balancing component (e.g., load balancing component 220). In some implementations, one or more process blocks of FIG. 6 may be performed by another device or a group of devices separate from or including the load balancing component, such as a network device (e.g., network device 210), a packet forwarding component (e.g., one or more of the plurality of packet forwarding components 230), and/or the like.

As shown in FIG. 6, process 600 may include obtaining, from a plurality of packet forwarding components, indications of load balancing metrics associated with a plurality of communication links that the plurality of packet forwarding components use to forward packet data (block 610). For example, the load balancing component (e.g., using processor 320, memory 330, storage component 340, input component 350, output component 360, communication interface 370 and/or the like) may obtain, from a plurality of packet forwarding components, indications of load balancing metrics associated with a plurality of communication links that the plurality of packet forwarding components use to forward packet data, as described above.

As further shown in FIG. 6, process 600 may include determining, based on the load balancing metrics, aggregate load balancing metrics associated with respective communication links of the plurality of communication links (block 620). For example, the load balancing component (e.g., using processor 320, memory 330, storage component 340, input component 350, output component 360, communication interface 370 and/or the like) may determine, based on the load balancing metrics, aggregate load balancing metrics associated with respective communication links of the plurality of communication links, as described above.

As further shown in FIG. 6, process 600 may include determining, based on the aggregate load balancing metrics, a load balancing schedule for the plurality of packet forwarding components, wherein the load balancing schedule indicates traffic distributions for the plurality of packet forwarding components (block 630). For example, the load balancing component (e.g., using processor 320, memory 330, storage component 340, input component 350, output component 360, communication interface 370 and/or the like) may determine, based on the aggregate load balancing metrics, a load balancing schedule for the plurality of packet forwarding components, as described above. In some implementations, the load balancing schedule indicates traffic distributions for the plurality of packet forwarding components.

As further shown in FIG. 6, process 600 may include providing indications of the traffic distributions to the plurality of packet forwarding components to permit the plurality of packet forwarding components to forward packet data based on the indications of the traffic distributions, wherein an indication of the indications of the traffic distributions indicates, for a particular packet forwarding component of the plurality of packet forwarding components, portions of packet data to forward via respective communication links of the plurality of communication links (block 640). For example, the load balancing component (e.g., using processor 320, memory 330, storage component 340, input component 350, output component 360, communication interface 370 and/or the like) may provide indications of the traffic distributions to the plurality of packet forwarding components to permit the plurality of packet forwarding components to forward packet data based on the indications of the traffic distributions, as described above. In some implementations, an indication of the indications of the traffic distributions indicates, for a particular packet forwarding component of the plurality of packet forwarding components, portions of packet data to forward via respective communication links of the plurality of communication links.

Process 600 may include additional implementations, such as any single implementation or any combination of implementations described below and/or in connection with one or more other processes described elsewhere herein.

In a first implementation, process 600 includes identifying a first communication link having a first aggregate rate of forwarded packet data that exceeds a second aggregate rate of forwarded packet data of a second communication link by an amount that satisfies a balancing threshold; and determining, based on the first aggregate rate of forwarded packet data exceeding the second aggregate rate of forwarded packet data by the amount that satisfies the balancing threshold, the load balancing schedule to: reduce the first aggregate rate of forwarded packet data, increase the second aggregate rate of forwarded packet data, or reduce the first aggregate rate of forwarded packet data and increase the second aggregate rate of forwarded packet data.

In a second implementation, alone or in combination with the first implementation, the plurality of communication links provide a variety of paths to another network device.

In a third implementation, alone or in combination with one or more of the first and second implementations, process 600 includes identifying one or more of the plurality of communication links having a rate of forwarded packet data that satisfies a threshold rate of forwarded packet data; and determining the load balancing schedule to reduce the rate of forwarded packet data of the one or more of the plurality of communication links.

In a fourth implementation, alone or in combination with one or more of the first through third implementations, the load balancing metrics comprise or more of: rates of packet data forwarded by the plurality of packet forwarding components via the plurality of communication links, or quantities of packets, of the packet data, forwarded by the plurality of packet forwarding components via the plurality of communication links.

In a fifth implementation, alone or in combination with one or more of the first through fourth implementations, the plurality of packet forwarding components are to use selector tables to select communication links of the plurality of communication links for forwarding packet data, and an indication of the indications of the traffic distributions indicates, for a particular packet forwarding component of the plurality of packet forwarding components, a modification of an associated selector table to modify portions of packet data to forward via respective communication links of the plurality of communication links.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term traffic or content may include a set of packets. A packet may refer to a communication structure for communicating information, such as a protocol data unit (PDU), a network packet, a datagram, a segment, a message, a block, a cell, a frame, a subframe, a slot, a symbol, a portion of any of the above, and/or another type of formatted or unformatted unit of data capable of being transmitted via a network.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A network device, comprising:
a load balancing component; and
a packet forwarding component, from a plurality of packet forwarding components, the packet forwarding component to:
forward, to the load balancing component, packets via a plurality of communication links to provide indications of load balancing metrics;
receive, from the load balancing component, indications of traffic distributions,
modify a data packet forwarding selection process based on the indications of traffic distributions,
wherein the data packet forwarding selection process distributes data packets among the plurality of communication links, and
wherein the modified data packet forwarding selection process shifts one or more data flows from a first communication link, of the plurality of communication links, to a second communication link of the plurality of communication links;
receive a data packet from another network device;
perform the modified data packet forwarding selection process on the data packet;
select the second communication link to send the data packet based on the modified data packet forwarding selection process; and
send the data packet via the second communication link.

2. The network device of claim 1, wherein the packet forwarding component, when performing the modified data packet forwarding selection process, is to:
determine a hash value of an element from the data packet; and
map the hash value to an entry of a selector table; and
wherein the packet forwarding component, when selecting the second communication link, is to:
select the second communication link to which the data packet is to be forwarded based on the selector table.

3. The network device of claim 1, wherein the packet forwarding component is further to:
use one or more selector tables to select the second communication link of the plurality of communication links for forwarding the data packet.

4. The network device of claim 1, wherein the packet forwarding component is implemented via an application-specific integrated circuit.

5. The network device of claim 1, wherein the plurality of communication links provide a plurality of paths to the other network device.

6. The network device of claim 1, wherein the load balancing component is further to:
obtain, from the plurality of packet forwarding components, indications of load balancing metrics associated with the plurality of packet forwarding components;
determine, based on the indications of load balancing metrics, aggregate load balancing metrics; and
determine, based on the aggregate load balancing metrics, a load balancing schedule for the plurality of packet forwarding components,
wherein the load balancing schedule indicates traffic distributions for the plurality of packet forwarding components.

7. The network device of claim 1, wherein the load balancing component is further to:
identify an imbalance in aggregate load balancing metrics; and
determine a load balancing schedule based on the imbalance.

8. The network device of claim 1, wherein the packet forwarding component, when receiving indications of traffic distributions, is to:
receive the indications of traffic distributions to balance a load among the plurality of packet forwarding components.

9. A method comprising:
forwarding, by a packet forwarding component to a load balancing component, packets via a plurality of communication links to provide indications of load balancing metrics;
receiving, by the packet forwarding component and from the load balancing component, indications of traffic distributions;
modifying, by the packet forwarding component, a data packet forwarding selection process based on the indications of traffic distributions,
wherein the data packet forwarding selection process distributes data packets among the plurality of communication links, and
wherein the modified data packet forwarding selection process shifts one or more data flows from a first communication link, of the plurality of communication links, to a second communication link of the plurality of communication links;
performing, by the packet forwarding component, the modified data packet forwarding selection process on a data packet based on the indications of traffic distributions;
selecting, by the packet forwarding component, the second communication link to send the data packet based on the modified data packet forwarding selection process; and sending, by the packet forwarding component, the data packet via the second communication link.

10. The method of claim 9, wherein performing the modified data packet forwarding selection process comprises:
determining a hash value of an element from the data packet; and
mapping the hash value to an entry of a selector table; and
wherein selecting the second communication link comprises:
selecting the second communication link to which the data packet is to be forwarded based on the selector table.

11. The method of claim 9, wherein performing the modified data packet forwarding selection process comprises:
modifying one or more portions of the data packet to forward via the second communication link.

12. The method of claim 9, further comprising:
sending, to the load balancing component, an updated indication of rates of forwarded packet data associated with the plurality of communication links;
receiving, from the load balancing component, updated indications of updated traffic distributions; and
forwarding the packet data based on the updated indications of the updated traffic distributions.

13. The method of claim 9, wherein indications of traffic distributions comprises:
receiving the indications of traffic distributions to balance a load among a plurality of packet forwarding components.

14. A non-transitory computer-readable medium storing instructions, the instructions comprising:
one or more instructions that, when executed by one or more processors of a component, cause the one or more processors to:
forward, to a load balancing component, packets via a plurality of communication links;
receive, from the load balancing component, indications of traffic distributions;
modify a data packet forwarding selection process based on the indications of traffic distributions,
wherein the data packet forwarding selection process distributes data packets among the plurality of communication links, and
wherein the modified data packet forwarding selection process shifts one or more data flows from a first communication link, of the plurality of communication links, to a second communication link of the plurality of communication links;
receive a data packet from another network device;
perform the modified data packet forwarding selection process;
select the second communication link to send the data packet based on the modified data packet forwarding selection process; and
send the data packet via the second communication link.

15. The non-transitory computer-readable medium of claim 14, wherein the one or more instructions, that cause the one or more processors to perform the data packet forwarding selection process, cause the one or more processors to:
determine a hash value of an element from the data packet; and
map the hash value to an entry of a selector table; and
wherein the one or more instructions, that cause the one or more processors to select the second communication link, cause the one or more processors to:
select the second communication link to which the data packet is to be forwarded based on the selector table.

16. The non-transitory computer-readable medium of claim 14, wherein the one or more instructions further cause the one or more processors to:
use one or more selector tables to select the second communication link of the plurality of communication links for forwarding the data packet.

17. The non-transitory computer-readable medium of claim 14, wherein the component is implemented via an application-specific integrated circuit.

18. The non-transitory computer-readable medium of claim 14, wherein the plurality of communication links provide a plurality of paths to the other network device.

19. The non-transitory computer-readable medium of claim 14, wherein the indications of the traffic distribution indicate portions of the data packet to forward via the second communication link.

20. The non-transitory computer-readable medium of claim 14, wherein the one or more instructions, that cause the one or more processors to receive the indications of traffic distributions, cause the one or more processors to:
receive the indications of traffic distributions to balance a load among a plurality of packet forwarding components.

* * * * *